United States Patent [19]

Thornley et al.

[11] Patent Number: 4,532,570

[45] Date of Patent: Jul. 30, 1985

[54] RELAY CIRCUIT AND RELAY THEREFOR

[75] Inventors: Derek Thornley; Jack Braithwaite, both of Nelson, England

[73] Assignee: Lucas Industries, Birmingham, England

[21] Appl. No.: 379,927

[22] Filed: May 19, 1982

[30] Foreign Application Priority Data

May 22, 1981 [GB] United Kingdom ................. 8115786

[51] Int. Cl.[3] ................................................ H02H 3/08

[52] U.S. Cl. ....................................... 361/93; 361/102; 361/187; 361/194; 335/256; 335/268

[58] Field of Search ..................... 361/208, 210, 93, 1, 361/170, 187, 194, 186, 102, 206, 166, 191, 192; 335/253, 256, 266, 268, 7, 16, 41, 154, 155, 157, 163

[56] References Cited

U.S. PATENT DOCUMENTS

| | | | |
|---|---|---|---|
| 3,060,352 | 10/1962 | Wiseman | 361/194 X |
| 3,906,476 | 9/1975 | Yonezu | 361/194 |
| 4,027,208 | 5/1977 | Look | 361/194 |
| 4,292,611 | 9/1981 | Bresson et al. | 335/16 X |

FOREIGN PATENT DOCUMENTS

| | | |
|---|---|---|
| 704400 | 5/1931 | France . |
| 1123015 | 9/1956 | France . |
| 346955 | 1/1922 | Netherlands . |
| 128584 | 11/1927 | Netherlands . |
| 259719 | 10/1926 | United Kingdom . |
| 268532 | 4/1927 | United Kingdom . |

*Primary Examiner*—Patrick R. Salce
*Attorney, Agent, or Firm*—Staas & Halsey

[57] ABSTRACT

An electrical circuit, controlled by an electromagnetic relay, comprising an electromagnetic relay having relay contacts for controlling current flow to a load in use, and a relay winding which, when energized, causes closure of said relay contacts. First manually operable switch means is provided for energizing said relay winding, and a feed connection is provided from said relay contacts to said relay winding whereby said winding is energized while said contacts are closed. A second manually operable switch means for short circuiting said relay winding is provided to permit said relay contacts to open. An overload protection winding is physically associated with the relay winding and connected in series with the contacts, said overload protection winding being such that when the current flowing therethrough exceeds a predetermined value the electromagnetic effect generated opposes the electromagnetic effect of the relay winding to a sufficient extent to permit said relay contacts to open.

The invention further relates to an electromagnetic relay.

3 Claims, 5 Drawing Figures

RELAY CIRCUIT AND RELAY THEREFOR

This invention relates to a circuit controlled by an electromagnetic relay and further relates to relay for use in such a circuit.

It has previously been proposed to utilize an electromagnetic relay to control current flow in a load, the closure of the relay contacts controlling flow of current to the load also providing an electrical feed to the relay winding to achieve a self hold operation. In order to protect the load in a fault situation it has been proposed to incorporate a fuse in series with load. The use of a fuse entails a number of disadvantages, a fuse being relatively slow to operate and thus when replaced, without the fault being corrected, permitting current again to flow in the load until the replacement fuse blows. Moreover owing to its size a fuse and its detachable terminal clips cannot conveniently be incorporated in the relay and so must be incorporated in the wiring between the relay and the load or in the load itself, both of which alternatives may be inconvenient from the point of view of access to the fuse for replacement. It is an object of the invention to provide a relay circuit wherein the above disadvantages are minimised, and to provide a relay for use in such a circuit.

A relay circuit according to the invention comprises an electromagnetic relay having relay contacts for controlling current flow to a load in use, and a relay winding which, when energised, causes closure of said relay contacts, first manually operable switch means for energising said relay winding, a feed connection from said relay contacts to said relay winding whereby said winding is energised while said contacts are closed, second manually operable switch means for short circuiting said relay winding to permit said relay contacts to open, and, an overload protection winding physically associated with said relay winding and connected in series with said relay contacts, said overload protection winding being such that when the current flowing therethrough exceeds a predetermined value the electromagnetic effect generated opposes the electromagnetic effect of the relay winding to a sufficient extent to permit said relay contacts to open.

Preferably said feed connection includes diode means for preventing energisation of the load by closure of said first switch means.

Desirably one end of said relay winding is connected to earth through a resistance, said resistance limiting current flow through said feed connection when said second switch means is operated to short circuit said relay winding.

Conveniently said first and second switch means are parts of a two-way manually operable switch.

Desirably the two-way switch has a stable off position and first and second unstable on positions in which respectively said first and second switch means are operable.

The invention further resides in an electromagnetic relay comprising a relay winding, relay contacts for controlling current flow in a load in series with the contacts in use, means urging the contacts to an open condition from which they are closed by energisation of the relay winding, a self-hold feed connection from the contacts to the relay winding whereby the winding is energised while the contacts are closed, and an overload protection winding connected in series with said relay contacts and wound adjacent said relay winding in opposition thereto whereby when the current flow through said relay contacts and therefore through said overload protection winding exceeds a predetermined value the electromagnetic effect generated by said protection winding opposes that generated by the relay winding to an extent such that said relay contacts can be moved by said urging means to their open condition.

Preferably the relay includes a housing containing the contacts and the windings and said housing has first and second terminals for connection to the supply and the load respectively, said overload protection winding and said relay contacts being connected in series between said first and second terminals, a third terminal for connection through first switch means to the supply and through second switch means to a fourth terminal, said relay winding being connected at one end to said third terminal and at the other end to said fourth terminal.

Conveniently said housing carries a fifth terminal for connection to earth, a resistor being connected between said fourth and fifth terminals.

One example of the invention is illustrated in the accompanying drawings, wherein.

Figure 1:
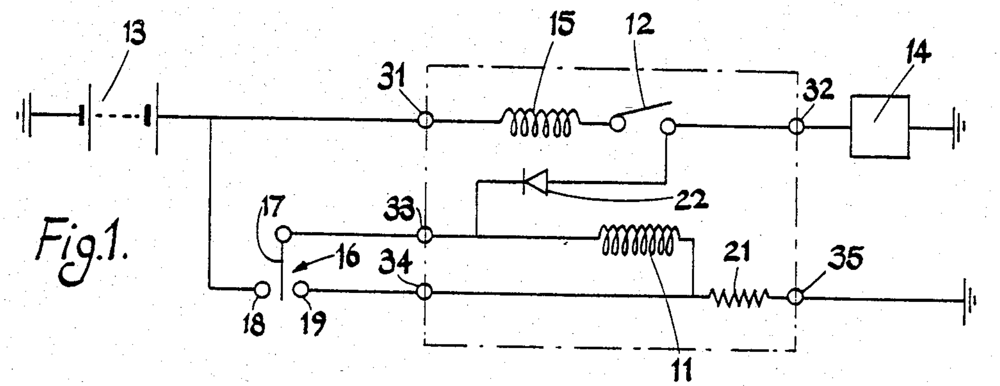
FIG. 1 is a schematic representation of an electrical circuit incorporating an electromagnetic relay.
Figure 2:
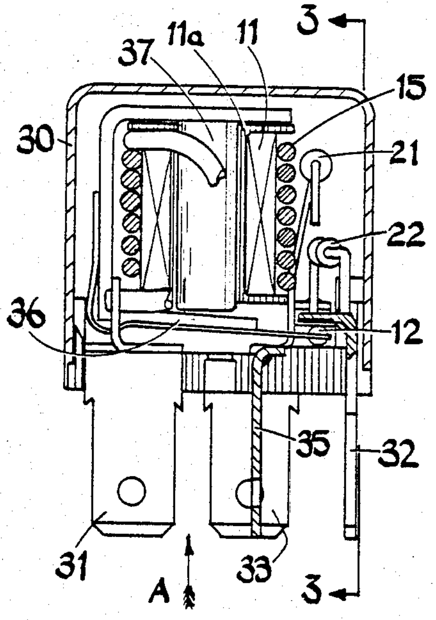
FIG. 2 is a sectional view of the relay schematically represented in FIG. 1.

Referring first to FIG. 1 of the drawings, the relay circuit includes an electromagnetic relay (indicated within the chain-line boundary) having a relay winding 11 and normally open relay contacts 12. The electromagnetic relay is conventional in the sense that energisation of the winding 11, which is of relatively high resistance, generates an electromagnetic effect resulting in closure of the contacts 12 against a spring bias. Opening and closing of the contacts 12 is used to control current flow from a source 13 through a load 14. In the drawing the source 13 is an electric storage battery the negative pole of which is earthed, and upon closure of the contacts 12 current flows from the positive pole of the battery through the load 14 to earth. Electrically connected in series with the contacts 12, between the contacts 12 and the source 13 is an overload protection winding 15 of relatively low electrical resistance. The construction of the electromagnetic relay includes a former **11*a* (FIG. 2) upon which the winding 11 is wound. The winding 15 is also wound on the same former, but as will become clear from the following description the winding 15 is wound in opposition to the winding 11**.

A two-way switch 16 having a common pole 17 has a first contact 18 electrically connected to the source 13. The common pole 17 of the switch 16 is connected to one end of the winding 11, the other end of the winding 11 being connected to the second contact 19 of the switch 16, and also being connected through a resistor 21 to earth. The switch 16 is a mono-stable switch, the stable position of the common pole 17 being between the contacts 18, 19. Thus in its stable position no electrical circuits are completed through the switch 16. However, the common pole 17 can be manually moved to either of a pair of operative positions from which will return to the central rest position upon release. In the first operative position of the switch the pole 17 engages the contact 18 whereas in the second operative position the pole 17 engages the contact 19.

One of the contacts 12 of the relay is connected through the winding 15 to the source 13, whereas the other of the contacts is connected through the load 14 to earth. The contact which is connected through the load 14 to earth is also connected to the anode of a diode 22, the cathode of diode 22 being connected to a point intermediate the pole 17 of the switch 16 and the winding 11.

The de-energised condition of the circuit is illustrated in FIG. 1, the contacts 12 being open and the pole 17 of the switch 16 occupying its central rest position. Thus no current flows in the load 14.

In order to energise the load 14 the operator manually moves the pole 17 of the switch 16 momentarily to engage the contact 18. This completes a circuit from the supply 13 through the winding 11 and the resistor 21 to earth, the diode 22 preventing any current flow via the switch 16 to the load 14. The current flow in the winding 11 energises the winding 11 causing closure of the contacts 12. Immediately the contacts 12 close the load 14 is energised, and even though the pole 17 of the switch 16 can be permitted to return to its central rest position the winding 11 remains energised by way of the self-hold feed connection from the contacts 12 by way of the diode 22. Thus the electromagnetic relay operates in a self-hold mode permitting current flow to the load 14. In order manually to de-energise the load 14 the pole 17 of the switch 16 is moved momentarily to engage the contact 19. Current flowing through the diode 22 can then short circuit the winding 11 by way of the pole 17 and contact 19 thus deenergising the winding 11 and permitting the contacts 12, under the action of their spring bias to open. Immediately the contacts 12 open the switch 16 can be permitted to return to its rest condition and the circuit will remain with the load 14 de-energised until the switch 16 is again moved to its first operative condition to energise the winding 11.

Returning to the self-hold condition wherein the contacts 12 are closed and current flows in the load 14, it will be recognised that the same current flows in the winding 15. Since the winding 15 is wound on the same former as the winding 11, then it will generate an electromagnetic effect on the contacts 12. The number of turns of the winding 15 is so chosen in relation to the intended current flow in the load 14 that during normal operating conditions the electromagnetic effect generated by the current flow in the winding 15 is swamped by the electromagnetic effect of the current flow in the winding 11. The contacts 12 thus remain closed under the action of the winding 11. However, in an overload situation, arising for example as a result of a fault in the load 14, the current flow in the winding 15 will rise.

There is a predetermined value of current flow through the winding 15 (determined by the nature of the winding 15 in relation to the nature of the winding 11) above which the electromagnetic effect generated by the winding 15 will oppose the electromagnetic effect of the winding 11 to an extent such that the overall electromagnetic effect is insufficient to maintain the contacts 12 closed against their bias, and thus the contacts 12 will open breaking the circuit to the load 14 and preventing further current flow in the load 14. It will be recognised that the value of overload current at which opening of the contacts 12 occurs can be determined by appropriate choice of the nature of the winding 15.

The operation of the winding 15 to cause opening of the contacts 12 in an overload condition is extremely rapid by comparison with, for example, a fusable link, and moreover the supply to the load 14 cannot be restored until the fault condition is removed. It will be recognised that if the switch 16 is moved to its first operative condition without rectifying the fault then immediately the contacts 12 close as a result of energisation of the winding 11 they will be opened again as a result of energisation of the winding 15 by a current in excess of the predetermined value. Moreover, the protection arrangement is provided within the structure of the electromagnetic relay, and thus no external structure, as would be required for a fusable link, is needed.

Figure 5:
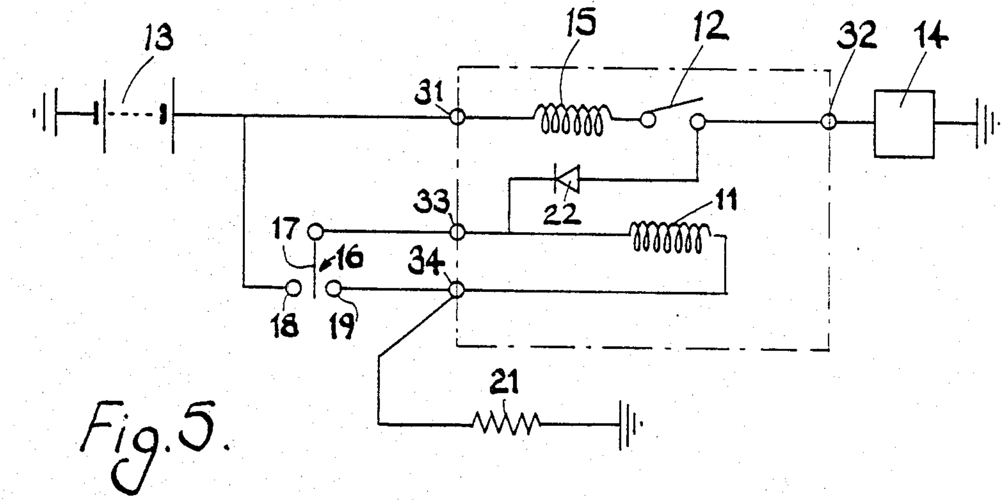
FIG. 5 is a view similar to FIG. 1 of a modification.

The resistor 21 can, if desired, be included within the structure of the relay, as shown in FIG. 1 or as shown in FIG. 5, the resistor 21 can be external to the relay structure. The resistor 21 serves to prevent excessive current flow through the winding 15, contacts 12 and diode 22 when the switch 16 is moved to its second operative condition to short circuit the winding 11.

Figure 3:
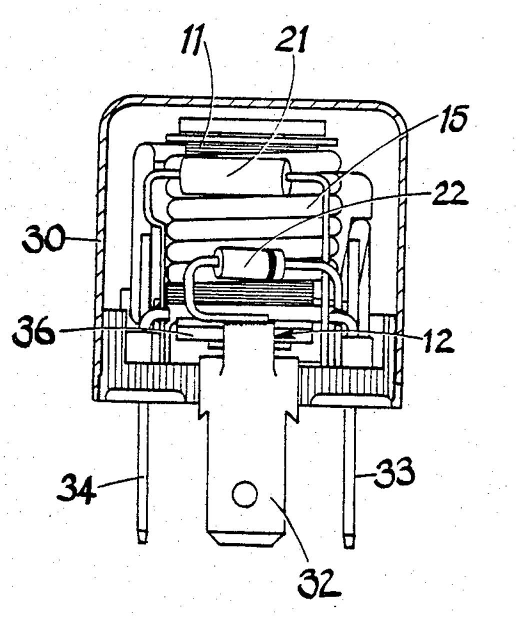
FIG. 3 is a sectional view on the line 3—3 in FIG. 2.
Figure 4:
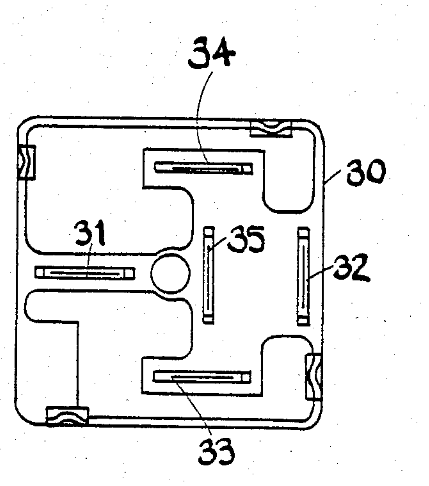
FIG. 4 is a view in the direction of arrow A in FIG. 2.

An electromagnetic relay for use in the circuit described above is illustrated in FIGS. 2, 3 and 4 and comprises a housing 30 having first, second, third, fourth and fifth external terminals 31, 32, 33, 34, 35. Within the housing 30 and connected in series between the first and second terminals 31, 32 are the winding 15 and the contacts 12, the terminals 31, 32 thus being intended for connection to the source 13 and the load 14 in use respectively. The movable contact of the contacts 12 is carried on an electromagnet armature 36, the winding 11 and the winding 15 being wound on the former 11*a* through which the electromagnet pole 37 extends. The windings 11 and 15 are wound on the former in opposite directions so that current flowing through the winding 15, the contacts 12, the diode 22, and the winding 11 generates electromagnetic effects of opposite polarity in the winding 15 and the winding 11 respectively. The diode 22 is within the housing of the relay, and has its anode connected to the terminal 32, and its cathode connected to the third terminal 33. The terminal 33 is also connected to one end of the winding 11, the other end of the winding 11 being connected to the fourth terminal 34. In use, the terminal 33 is intended for connection to the pole 17 of the switch 16, and the fourth terminal 34 is intended for connection to the contact 19 of the switch 16. The resistor 21 is also received within the housing 30 of the relay, and the fifth terminal 35 is connected internally of the housing to one end of the resistor 21, the other end of the resistor 21 being connected internally of the housing to the terminal 34 and the terminal 35 being intended for connection to earth.

As mentioned previously the resistor 21 can, if desired, be external to the housing 30 of the relay. In such an arrangment the terminal 35 can be dispensed with and terminal 34 will be intended for connection both to the switch contact 19 and through the externally mounted resistor 21 to earth, as schematically represented by FIG. 5.

In a practical embodiment of the arrangement described above the load 14 is a rear window heater of a road vehicle. The battery 13 is a 12 volt battery and the resistance of the heater 14 is such that when operating normally there is a current flow of 10 amperes in the heater. The winding 11 has a resistance of 50 ohms, being constructed from 1,344 turns of 0.125 mm diameter wire. The value of resistor 21 is 18 ohms and the winding 15 has a resistance of 0.0042 ohms, being constructed from 7 turns of wire of 1.18 mm diameter.

In operation the voltage drop in the winding 15 during normal current flow is $10 \times 0.0042 = 0.042$ volts and the maximum expected voltage drop across the diode 22 is 1.0 volts. It follows therefore that the voltage applied across the combination of winding 11 and resistor 21 is:

$$12.0 - 1.0 - 0.042 = 10.96 \text{ volts}$$

and from this it is calculated that the voltage across winding 11 is:

$$\frac{10.96 \times 50}{68} = 8.06 \text{ volts}$$

Given a voltage drop of 8.06 volts across winding 11 the number of ampere turns produced by the winding 11 is:

$$\frac{8.06 \times 1{,}344}{50} = 216$$

It is known that if the number of ampere turns falls to 70 or below the contacts 12 will open and thus the number of reverse ampere turns required from the winding 15 to cause the contacts to open is $216 - 70 = 146$. It follows therefore that the fault current at or above which the contacts 12 open is:

$$\frac{146}{7} = 20.8 \text{ amperes}$$

We claim:

1. An electromagnetic relay comprising:

a relay winding, relay contacts for controlling current flow in a load in series with the contacts in use, urging means for urging the relay contacts to an open condition from which they are closed by energisation of the relay winding a self-hold, diode means feed connection from the relay contact to the relay winding such that the winding is energised while the relay contacts are closed, and an overload protection winding connected in series with the relay contacts and wound adjacent said relay winding in opposition thereto, such that when the current flow through said relay contacts and therefore through said overload protection winding exceeds a predetermined value the electromagnetic effect generated by said protection winding opposes that generated by the relay winding to an extent such that said relay contacts can be moved by said urging means to their open condition.

2. A relay as claimed in claim 1, wherein there is provided a housing containing the relay contacts and the windings and said housing has first and second terminals for connection to a supply and the load respectively, said overload protection winding and said relay contacts being connected in series between said first and second terminals, a third terminal for connection through first switch means to the supply and through second switch means to a fourth terminal, said relay winding being connected at one end to said third terminal and at the other end to said fourth terminal.

3. A relay as claimed in claim 2 wherein said housing carries a fifth terminal and a resistor is connected between said fourth and fifth terminals.

* * * * *